United States Patent
Weinstock et al.

(10) Patent No.: US 10,648,453 B2
(45) Date of Patent: May 12, 2020

(54) WIND POWER SYSTEM AND METHOD FOR GENERATING ELECTRICAL ENERGY FROM WIND

(71) Applicants: Eliyahu Weinstock, Kfar Saba (IL); Zion Peretz, Raanana (IL); Abraham Melamed, Raanana (IL)

(72) Inventors: Eliyahu Weinstock, Kfar Saba (IL); Zion Peretz, Raanana (IL); Abraham Melamed, Raanana (IL)

( * ) Notice: Subject to any disclaimer, the term of this patent is extended or adjusted under 35 U.S.C. 154(b) by 0 days.

(21) Appl. No.: 15/939,531

(22) Filed: Mar. 29, 2018

(65) Prior Publication Data

US 2019/0301428 A1    Oct. 3, 2019

(51) Int. Cl.
*F03D 3/04*      (2006.01)
*F03D 3/00*      (2006.01)

(52) U.S. Cl.
CPC ........... *F03D 3/0409* (2013.01); *F03D 3/005* (2013.01); *F03D 3/0427* (2013.01)

(58) Field of Classification Search
CPC ........ F03D 3/04; F03D 3/0409; F03D 3/0427; F03D 3/005
See application file for complete search history.

(56) References Cited

U.S. PATENT DOCUMENTS

| | | | |
|---|---|---|---|
| 1,647,461 A * | 11/1927 | Miller .................... | F03D 3/0409 416/235 |
| 4,551,631 A * | 11/1985 | Trigilio ................. | F03D 3/0409 290/55 |
| 7,329,965 B2 | 2/2008 | Roberts | |
| 8,564,154 B2 | 10/2013 | Bahari | |
| 8,790,068 B2 | 7/2014 | Cantwell | |
| 8,961,103 B1 * | 2/2015 | Wolff .................... | F03D 3/0409 415/4.2 |
| 9,695,801 B1 * | 7/2017 | Shoffler ............... | F03D 3/0409 |
| 2002/0180216 A1 * | 12/2002 | McDavid, Jr. ........... | F04D 1/04 290/54 |
| 2003/0122380 A1 * | 7/2003 | Harbison .................. | F03D 3/02 290/55 |
| 2004/0130161 A1 * | 7/2004 | Gomez Gomar ..... | F03D 3/0409 290/55 |
| 2007/0241567 A1 | 10/2007 | Platt | |
| 2009/0274561 A1 * | 11/2009 | Gornatti ............... | F03D 3/0409 416/239 |
| 2011/0140450 A1 * | 6/2011 | Kawas .................. | F03D 3/0418 290/55 |
| 2011/0221196 A1 * | 9/2011 | Kawas .................. | F03D 3/0418 290/44 |
| 2011/0316279 A1 * | 12/2011 | Bahari ..................... | F03D 1/04 290/44 |
| 2012/0213630 A1 * | 8/2012 | Alfonsi ..................... | F01D 1/14 415/182.1 |

(Continued)

OTHER PUBLICATIONS

Wind—Senerji Soluitons www.senerjisolutions.com/wind/.

*Primary Examiner* — Sean Gugger
(74) *Attorney, Agent, or Firm* — Oren Reches (57) ABSTRACT

There may be provided a wind power system that may include a turbine that comprises multiple curved blades that rotate about a vertical axis; wind collectors that surround the turbine; wherein each wind collector comprises a set of facets that define an outlet and an opening that is bigger than the outlet; wherein the outlet faces the turbine; and a ventilation mechanism.

14 Claims, 11 Drawing Sheets

(56) References Cited

U.S. PATENT DOCUMENTS

| | | | |
|---|---|---|---|
| 2013/0195636 A1* | 8/2013 | Poole | F03D 7/06 415/203 |
| 2015/0098828 A1* | 4/2015 | Devisch | F03D 3/0409 416/176 |
| 2016/0084227 A1* | 3/2016 | Krippene | F03D 9/39 290/55 |
| 2016/0186720 A1 | 6/2016 | Song | |
| 2018/0163696 A1* | 6/2018 | Vaz | F03D 3/005 |

\* cited by examiner

Substitute specification

WIND POWER SYSTEM AND METHOD FOR GENERATING ELECTRICAL ENERGY FROM WIND

BACKGROUND

There is a growing need to harness the wind power for generation of energy.

U.S. patent application 2010/0230974 of Cantwell and U.S. patent application 2011/0316279 of Bahari illustrate wind turbines.

SUMMARY

Systems and methods as illustrated in the specification and/or claims and/or drawings.

There may be provided a wind power system, that may include a turbine that may include multiple curved blades that rotate about a vertical axis; wind collectors that surround the turbine; wherein each wind collector may include a set of facets that define an outlet and an opening that is bigger than the outlet; wherein the outlet faces the turbine; and a venting mechanism that is configured to selectively allow some of the wind that passes through a wind collector to exit from the wind collector via the venting mechanism and not through the outlet.

The venting mechanism may be configured to allow the some of the wind that passes through the wind collector to exit from the wind collector via the venting mechanism when a speed of the wind exceeds a speed threshold.

The venting mechanism may be configured to prevent the some of the wind that passes through the wind collector to exit from the wind collector via the venting mechanism when a speed of the wind may be below a speed threshold.

The venting mechanism may include multiple blockers that may be arranged to selectively close multiple openings formed within multiple wind collectors.

The set may include a top facet and a bottom facet; wherein the venting mechanism may include a top opening, a bottom opening, a top blocker and a bottom blocker.

The set may include a right facet and a left facet; wherein the venting mechanism may include a left blocker for blocking a left opening and a right blocker for blocking a right opening.

The venting mechanism may be configured to selectively allow some of the wind that passes through at least two wind collectors to exit from the at least two wind collectors via the venting mechanism and not through outlets of the at least two wind collectors.

The wind collectors may include a first wind collector and a second wind collector that may be adjacent to each other; wherein a first opening may be formed in the first wind collector and a second opening may be formed in the second wind collector; wherein the first opening faces the second wind collector and the second opening faces the first wind collector; wherein the venting mechanism may include a first blocker for selectively blocking the first opening, and a second blocker for selectively blocking the second opening; wherein the first blocker may be arranged to move towards the second wind collector within a gap formed between the first and second wind collectors; and wherein the second blocker may be arranged to move towards the first wind collector within the gap.

The first wind collector and the second wind collector may be positioned at different height.

The first wind collector and the second wind collector may be positioned at different angular displacement in relation to the axis.

There may be provided a wind power system that may include a turbine that may include multiple curved blades that rotate about a vertical axis; and wind collectors that surround the turbine; wherein each wind collector may include a set of facets that define an outlet and an opening; wherein the opening may be a polygon that may be non-rectangular and may be bigger than the outlet; wherein the outlet faces the turbine; wherein the wind collectors may be shaped and sized to define a gap between adjacent wind collectors.

The bottom facet of the set may be not horizontal.

Each facet may have a negative slope—it may be inclined towards the turbine.

The set may include a right facet, a left facet, a top facet and a bottom facet, wherein the top facet may be non-horizontal and the bottom facet may be not horizontal.

The opening may be non-parallel to the outlet.

The outlet may face a concave side of a curved blade.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Any reference to an apparatus or to a system should be applied, mutatis mutandis to a method that is executed by the system.

Any reference to method should be applied, mutatis mutandis to a system that is configured to execute the method.

The term "and/or" is additionally or alternatively.

There may be provided a wind power system and a method. The wind power system can generate energy from wind even at low wind speeds, collects winds from different direction, effectively directs the wind to the turbine, can withstand strong winds without damaging the turbine, is cost effective and has a relative small foot print.

The system may include a ventilation mechanism that diverts at least some of the wind from the turbine—when the wind speed exceeds a speed threshold—thereby preventing the system from being damaged due to strong wind. The threshold may be adapted based on the durability of the system—especially the durability of the turbine. The speed threshold may, for example, be 60, 70 km/h and above.

The system includes wind collectors that surround a space in which the turbine is located. The wind collectors may have openings that are non-rectangular (or may be rectangular). Especially—the bottom edge of the opening is not horizontal.

There may be a gap between adjacent wind collectors and this allows elements of the ventilation mechanism to move in the gap.

Even when these are multiple layers of wind collectors the system may include a frame that is connected to the wind collectors—but may not require a dedicate floor per each layer.

In FIGS. 1-7 the following reference numbers have the following meaning:

| Wind collector | 10 |
|---|---|
| Wind collectors | 10(1), 10(2), 10(3), 10(4), 10(5), 10(6), 10(11) |
| Lower edge of opening | 11 |
| Right edge of opening | 12 |
| Top edge of opening | 13 |
| Left edge of opening | 14 |
| Lower facet | 21 |
| Right facet | 22 |
| Top facet | 23 |
| Left facet | 24 |
| Inlet | 31 |
| Outlet | 32 |
| Turbine | 40 |
| Axis of turbine | 41 |
| Curved blades of turbine | 42 |
| Bottom opening | 51 |
| Right opening | 52 |
| Top opening | 53, 53(1), 53(2), 53(3) 53(4), 53(5) and 53(6). |
| Left opening | 54 |
| Bottom blocker | 61 |
| Right blocker | 62 |
| Top blocker | 63 |
| Left blocker | 64 |
| Gaps | 81, 82, 83, 84, 85 and 86 |
| Mesh | 90 |
| Stories | 102, 112, 132, 142, 152, 162, 172, 182 and 192 |
| Structural elements | 111 |

Figure 1:
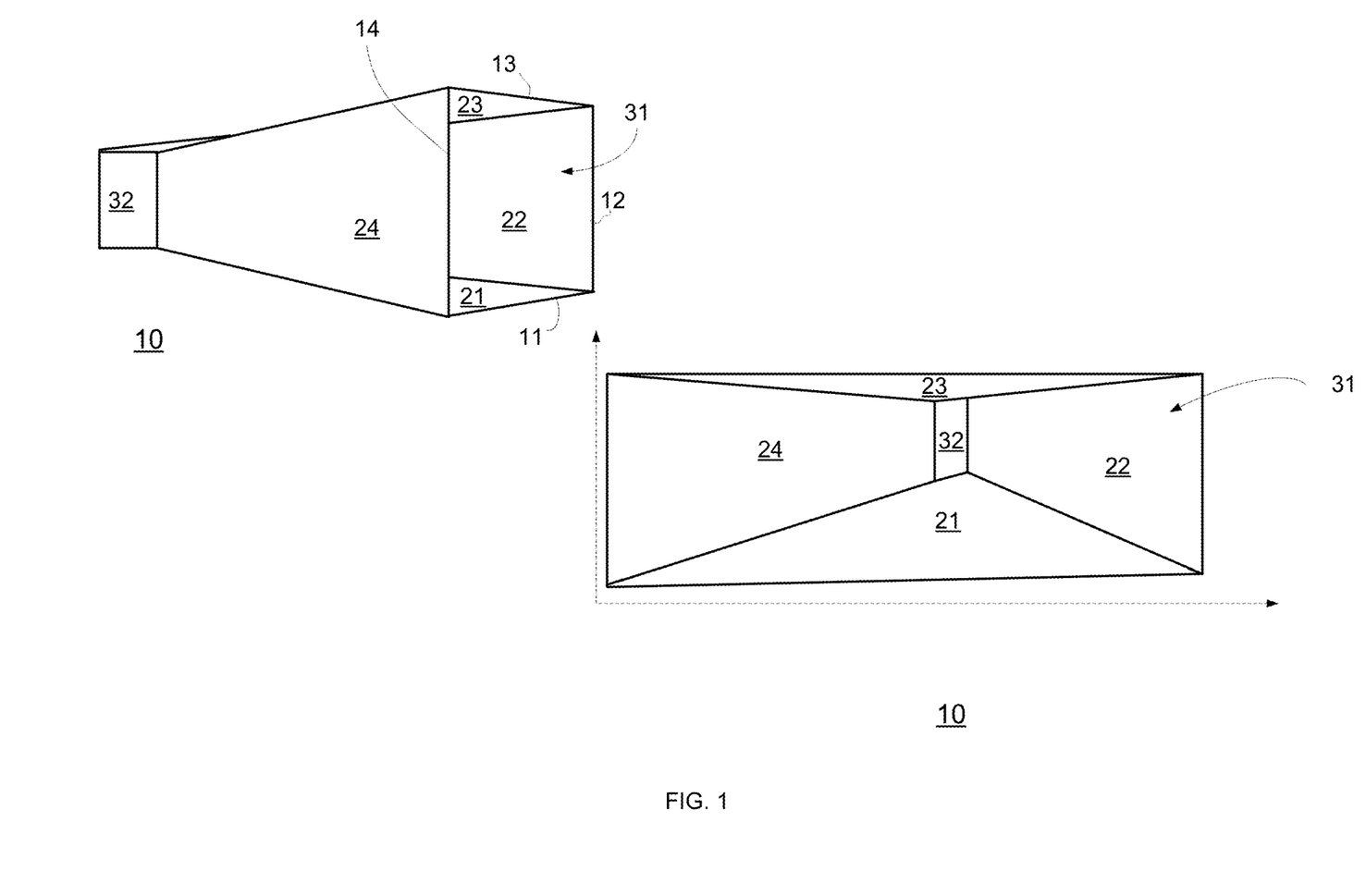
FIG. 1 is an example of a wind collector.

FIG. 1 illustrates wind collector 10 that includes inlet 31, outlet 32 and a set of facets such as bottom, right, top and left facets 21, 22, 23 and 24. Inlet 31 is bigger than outlet 32—thereby amplifying the wind that enters inlet 32.

The inlet 31 may be a polygon that is non-rectangular—for example it may include right and left facets that are vertical and top and bottom facets that are not vertical and not horizontal.

The orientation of the bottom and top facets may reduce the footprint of the system.

Each facet may be oriented towards the outlet (or axis of the turbine).

Figure 2:
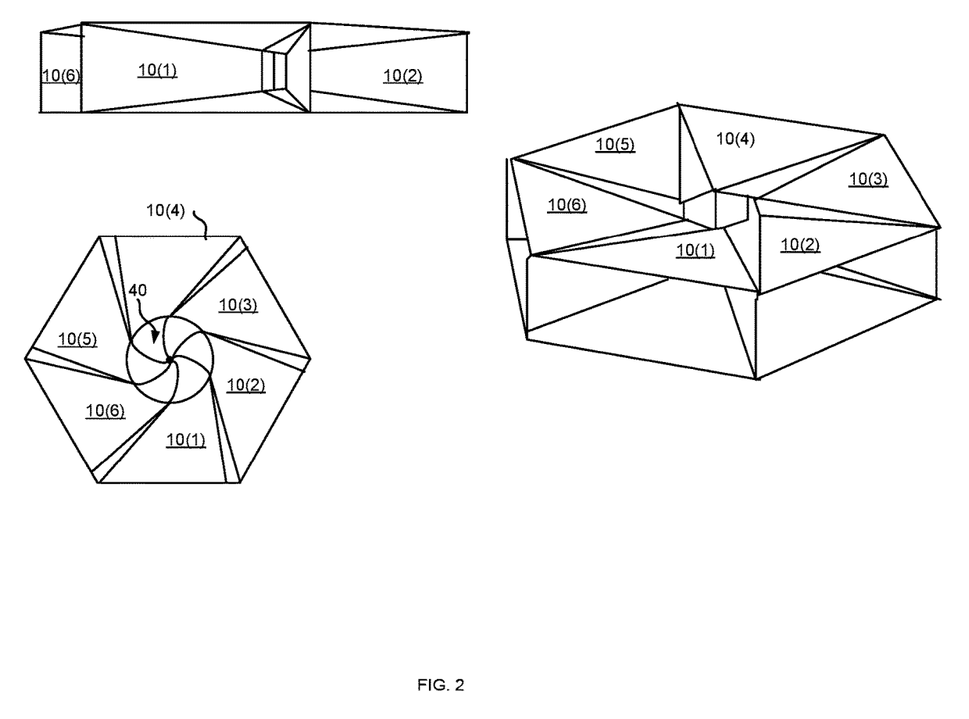
FIG. 2 is an example of wind collectors and a turbine.

FIG. 2 illustrates wind collectors 10(1)-10(6) that surround turbine 40 and there is a gap between adjacent wind collectors.

Figure 3:
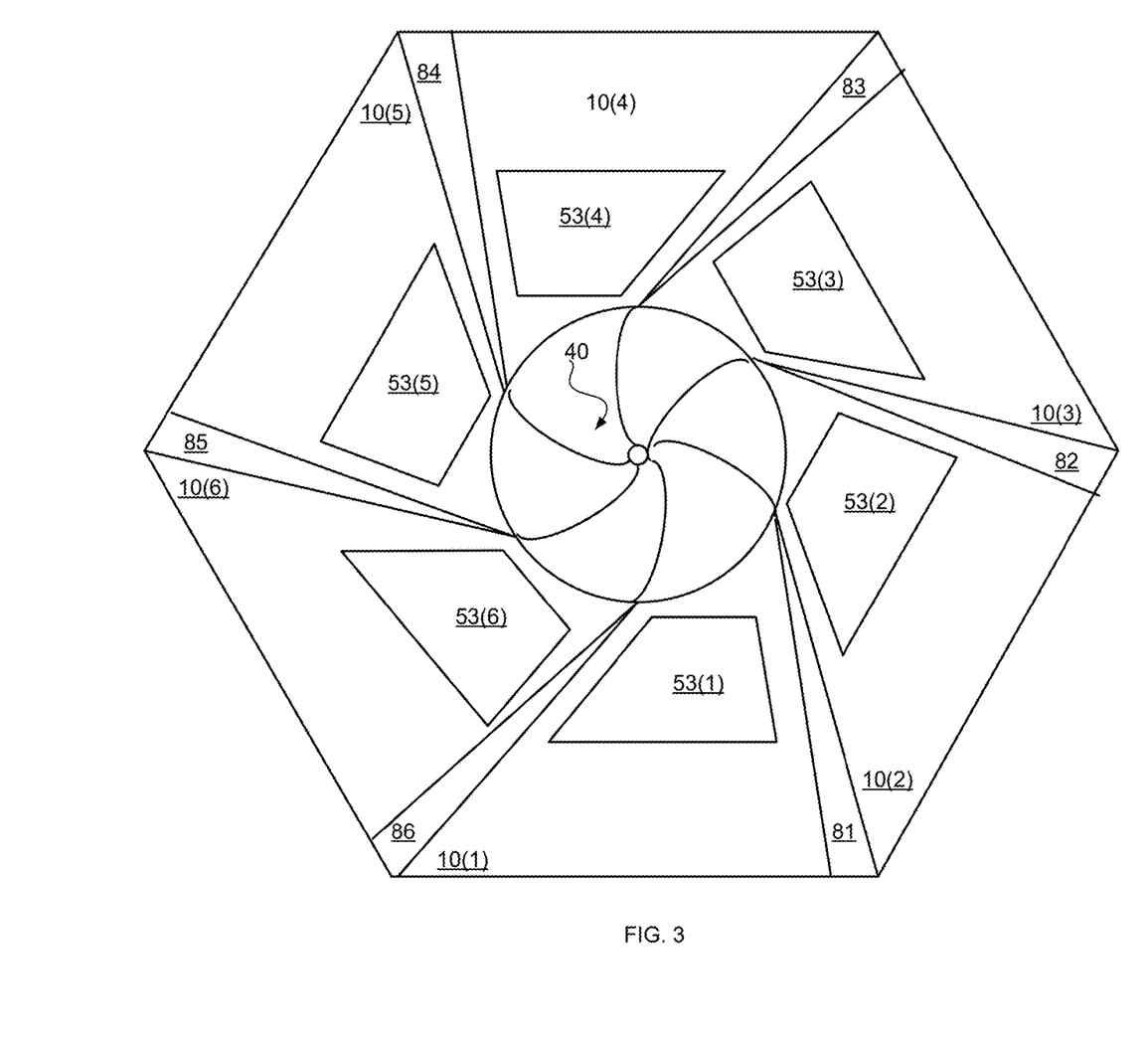
FIG. 3 is an example of wind collectors and a turbine.

FIG. 3 illustrates wind collectors 10(1)-10(6) that surround turbine 40. FIG. 3 illustrates gaps 81-86 between adjacent wind collectors.

FIG. 3 also shows top openings 51(1)-53(6) formed in the top facets of wind collectors 10(1)-10(6) respectively.

These openings may be closed (by blockers of the ventilation mechanism) when the wind has a speed that is below a speed threshold—thereby directing all the wind that enters a wind collector through the outlet—for maximizing energy conversion. When the speed of the wind is above a speed threshold—then openings are opened and part of the wind may exit through the ventilation mechanism (through the windows) and not through the outlet (only some of the wind will exit through the outlet).

Figure 4:
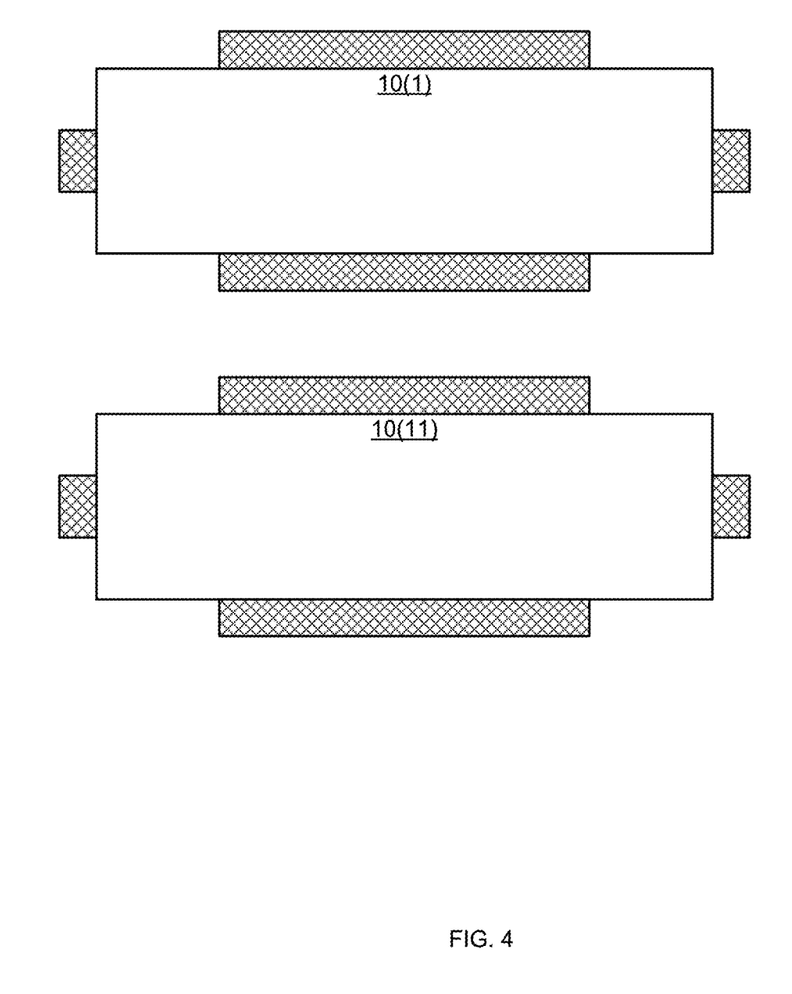
FIG. 4 is an example of of wind collectors and a ventilation mechanism.
Figure 5:
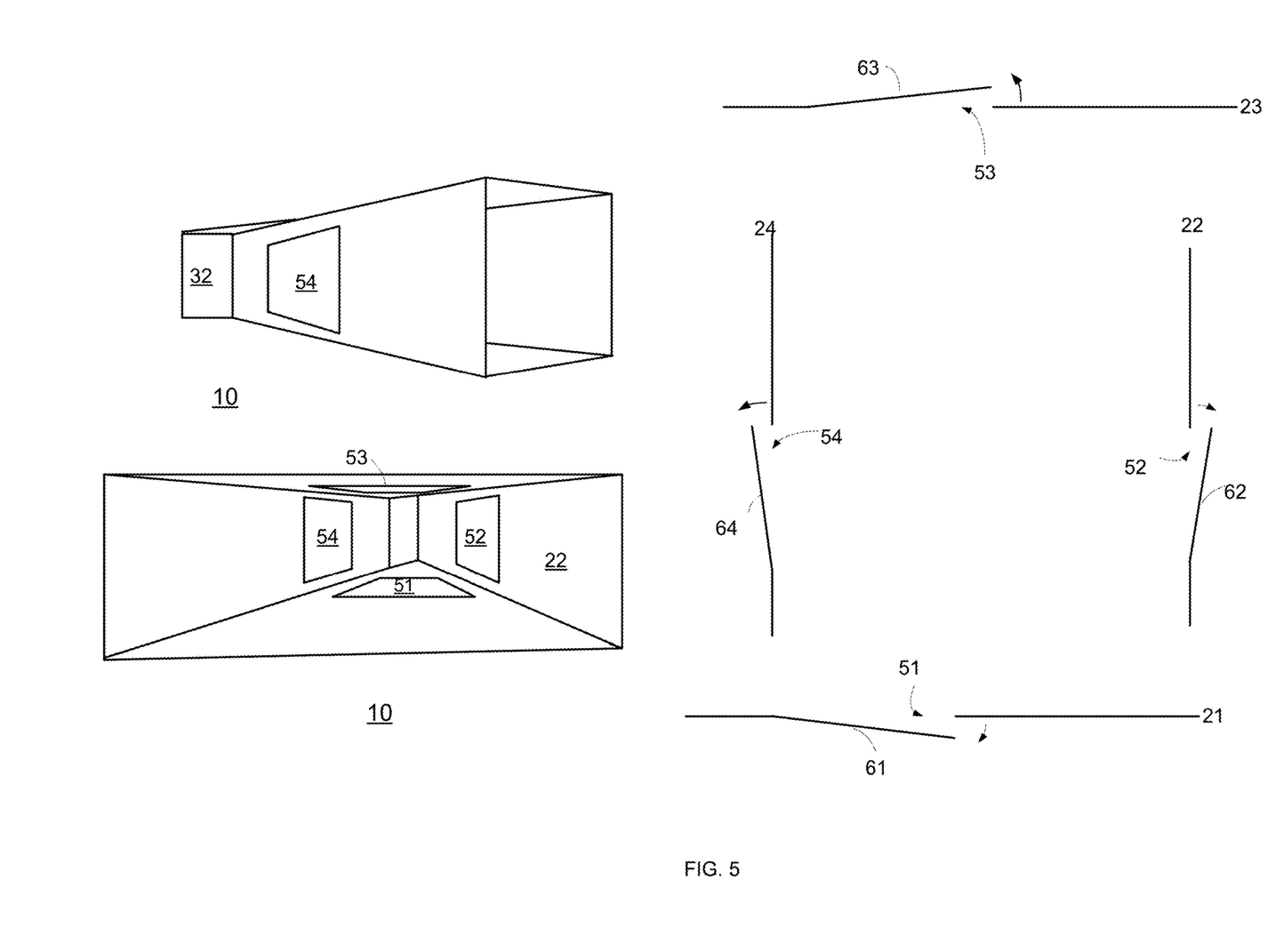
FIG. 5 is an example of a wind collector and a ventilation mechanism.

FIGS. 4 and 5 illustrates blocking elements that extend outside wind collectors 10(1) and 10(11)—when the wind speed exceeds the wind threshold.

The blocking elements may be plates, or any element that may be pivotally (or otherwise) coupled to a wind collector. The blocking of an opening may include sealing the opening or closing the opening without sealing it.

Figure 6:
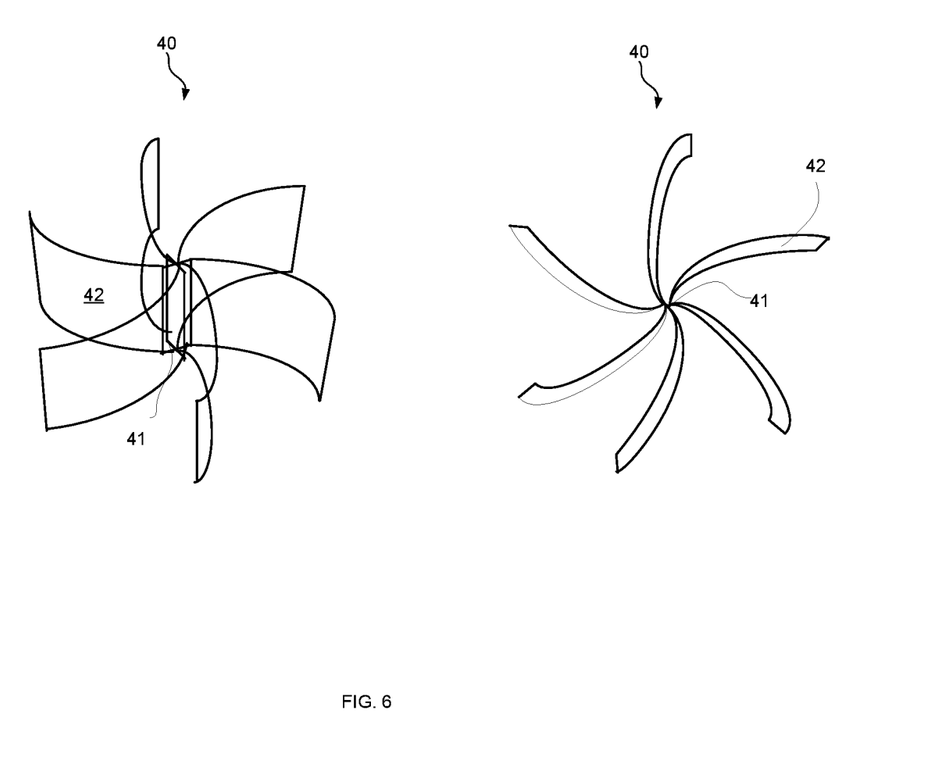
FIG. 6 is an example of a turbine.

FIG. 6 is an example of a turbine that includes curved blades 42 that are coupled to axis 41.

Figure 7:
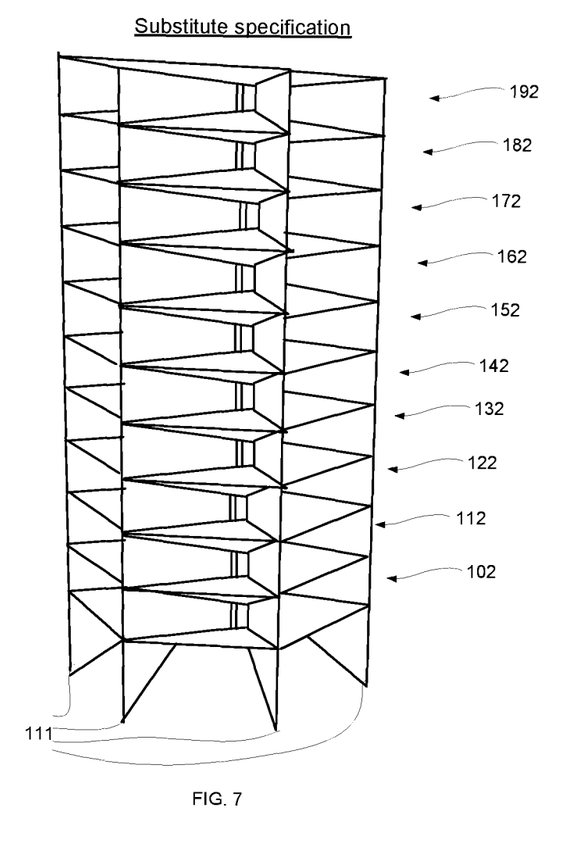
FIG. 7 is an example of a wind power system.

FIG. 7 is an example of a wind power system. It includes multiple stores 102, 112, 122, 132, 142, 152, 162, 172, 182 and 192.

There may be provided a method for generating power from wind power by utilizing any of the systems mentioned above.

Figure 8:
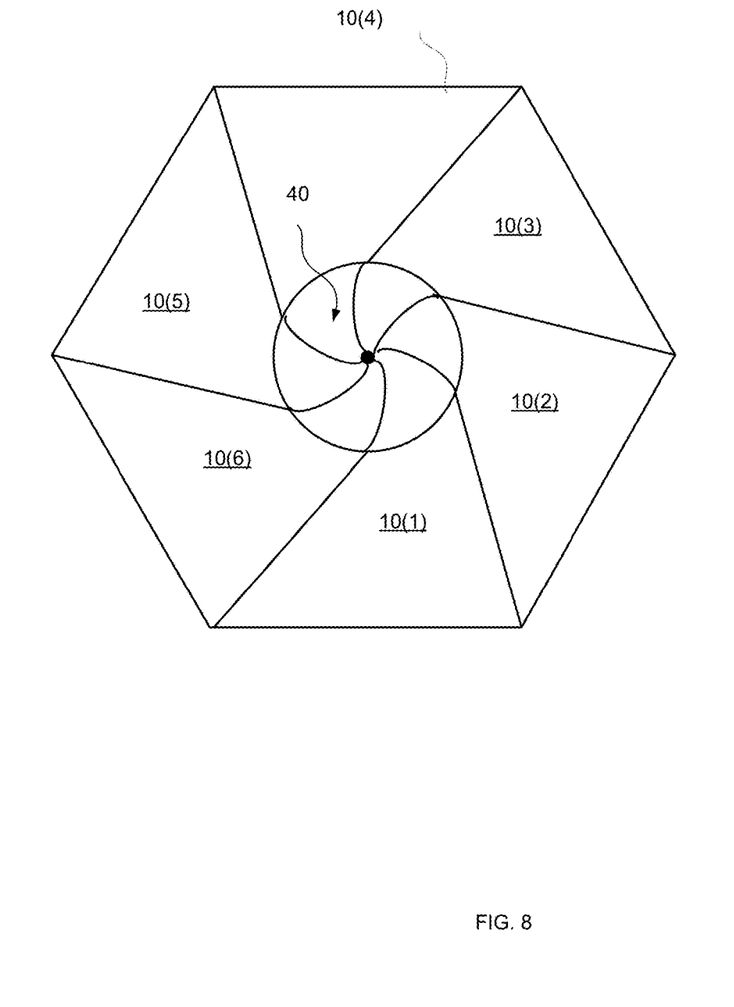
FIG. 8 is an example of wind collectors and a turbine.
Figure 9:
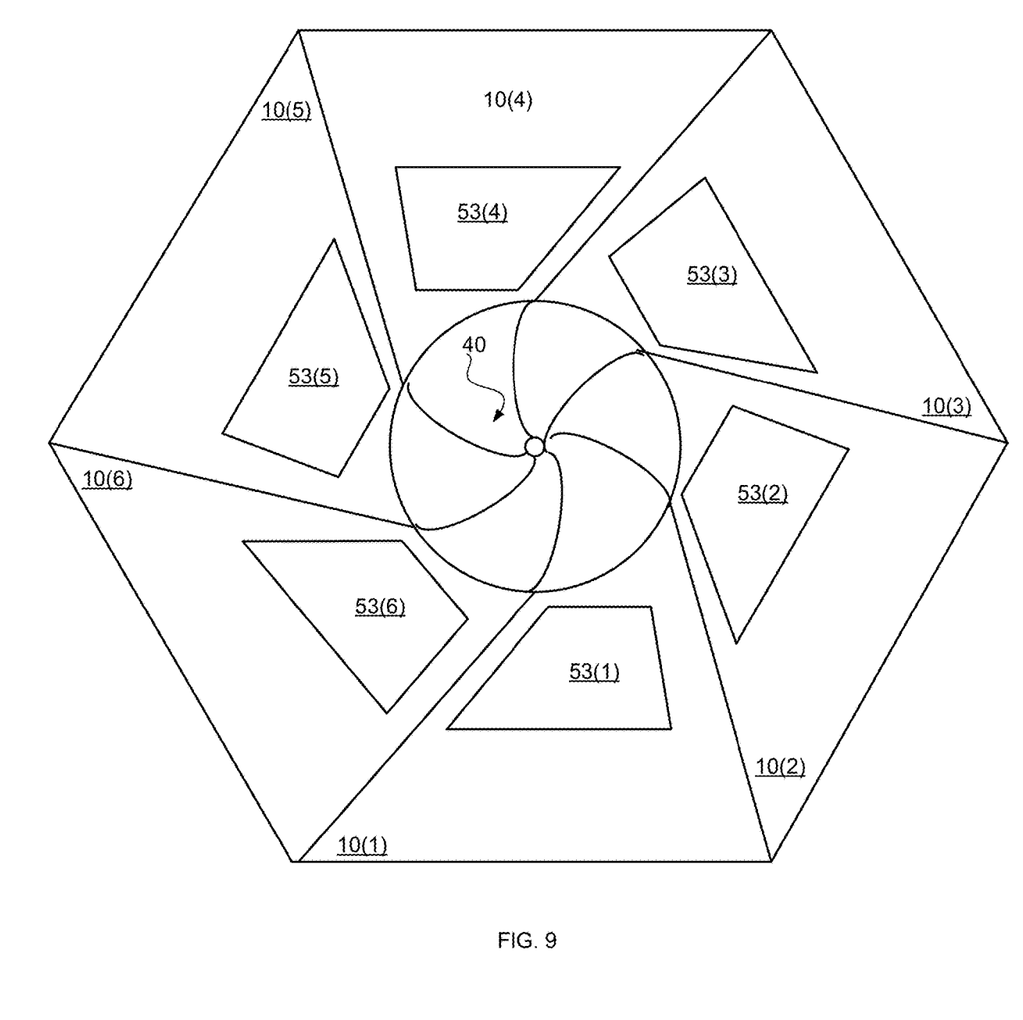
FIG. 9 is an example of wind collectors and a turbine.

FIGS. 8-9 illustrates wind collectors 10(1)-10(6) that surround turbine 40. In contrary to the wind collectors of FIG. 2-3 there is no gap between the sidewalls of adjacent wind collectors. Gaps may or may not exist between the wind collectors of adjacent stores.

Figure 10:
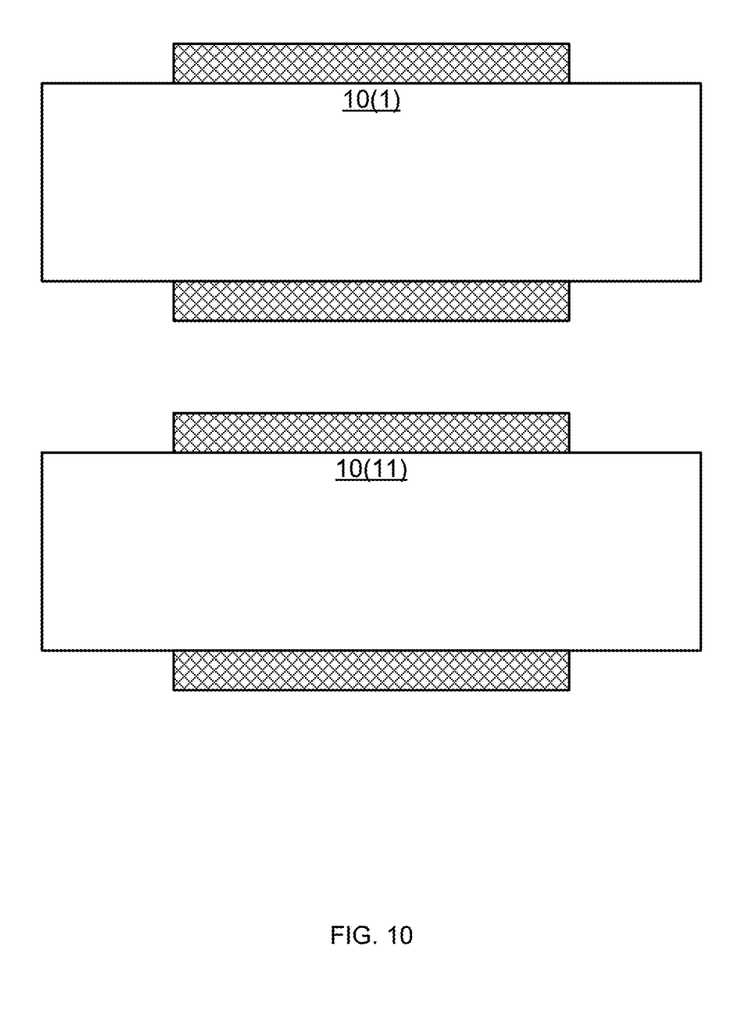
FIG. 10 is an example of wind collectors and a turbine.

FIG. 10 illustrates blocking elements that extend outside the top and bottom panels of wind collectors 10(1) and 10(11)—without blocking elements that extend from the sidewalls of the wind collectors.

Figure 11:
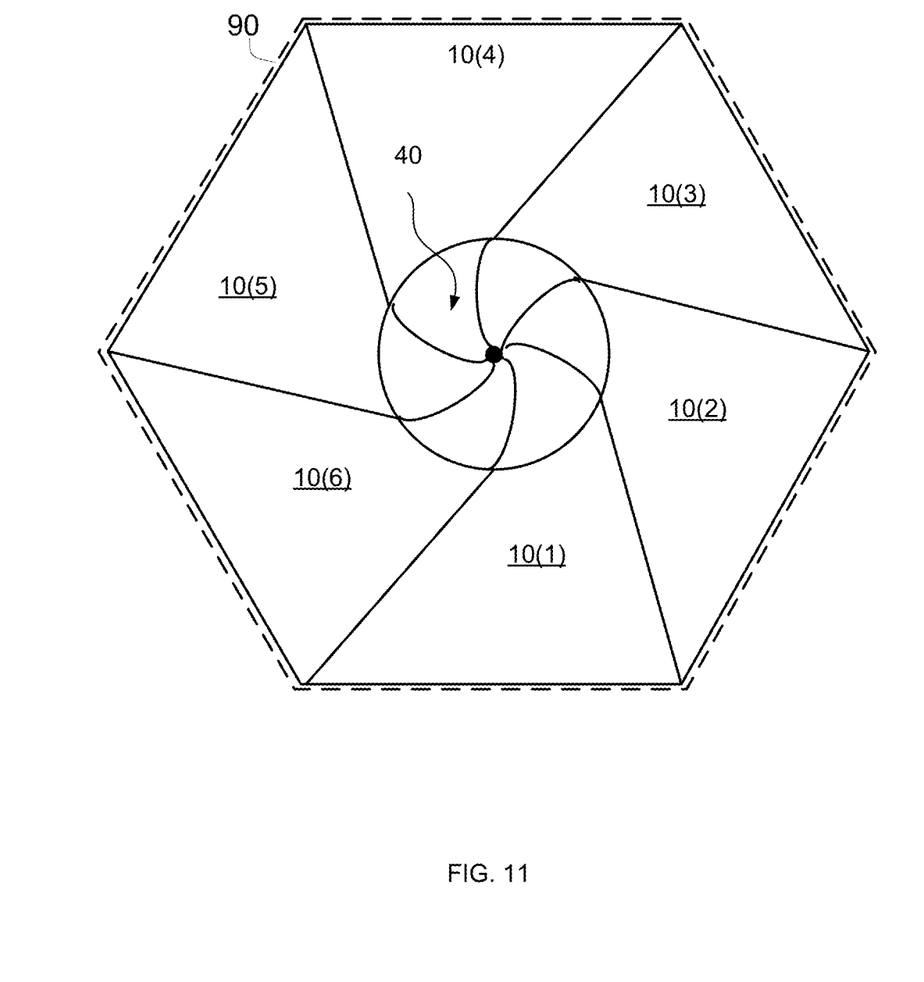
FIG. 11 is an example of wind collectors and a turbine.

FIG. 11 also illustrates a mesh 90 that surrounds the wind collectors. The mesh may prevent birds from entering the wind collectors.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a wind power system as including a certain component should also cover the scenario in which the wind power system does not include the certain component. For example—any reference to a method as including a certain step should also cover the scenario in which the method does not include the certain component. Yet for another example—any reference to a wind power system that is configured to perform a certain operation should also cover the scenario in which the wind power system is not configured to perform the certain operation.

The terms "including", "comprising", "having", "consisting" and "consisting essentially of" are used in an interchangeable manner.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A wind power system, comprising:
   a turbine that comprises multiple curved blades that rotate about a vertical axis;
   wind collectors that surround the turbine; wherein each wind collector comprises a set of facets that define an outlet and an opening that is bigger than the outlet; wherein the outlet faces the turbine; and
   a venting mechanism that is configured to selectively allow some of the wind that passes through a wind collector to exit from the wind collector via the venting mechanism and not through the outlet;
   wherein the wind collectors comprise a first wind collector and a second wind collector that are adjacent to each other;
   wherein a first opening is formed in the first wind collector and a second opening is formed in the second wind collector;
   wherein the first opening faces the second wind collector and the second opening faces the first wind collector;
   wherein the venting mechanism comprises a first blocker for selectively blocking the first opening, and a second blocker for selectively blocking the second opening;
   wherein the first blocker is arranged to move towards the second wind collector within a gap formed between the first and second wind collectors; and
   wherein the second blocker is arranged to move towards the first wind collector within the gap.

2. The wind power system according to claim 1, wherein the venting mechanism is configured to allow the some of the wind that passes through the wind collector to exit from the wind collector via the venting mechanism when a speed of the wind exceeds a speed threshold.

3. The wind power system according to claim 2, wherein the venting mechanism is configured to prevent the some of the wind that passes through the wind collector to exit from the wind collector via the venting mechanism when a speed of the wind is below a speed threshold.

4. The wind power system according to claim 1, wherein the set of facets comprises a top facet and a bottom facet; wherein the venting mechanism comprises a top opening, a bottom opening, a top blocker and a bottom blocker.

5. The wind power system according to claim 1, wherein the set of facets comprises a right facet and a left facet.

6. The wind power system according to claim 1, wherein the venting mechanism is configured to selectively allow some of the wind that passes through at least two wind collectors to exit from the at least two wind collectors via the venting mechanism and not through outlets of the at least two wind collectors.

7. The wind power system according to claim 1, wherein the first wind collector and the second wind collector are positioned at different heights.

8. The wind power system according to claim 1, wherein the first wind collector and the second wind collector are positioned at different angular displacements in relation to the vertical axis.

9. The wind power system according to claim 1.

10. The wind power system according to claim 1 wherein a bottom facet of the set of facets is not horizontal.

11. The wind power system according to claim 1, wherein each facet has a negative slope.

12. The wind power system according to claim 1 wherein the set of facets comprises a right facet, a left facet, a top facet and a bottom facet, wherein the top facet is non-horizontal and the bottom facet is not horizontal.

13. The wind power system according to claim 1, wherein the opening is not parallel to the outlet.

14. The wind power system according to claim 1, wherein the outlet faces a concave side of a curved blade.

\* \* \* \* \*